United States Patent [19]

Lawson et al.

[11] Patent Number: 5,310,798

[45] Date of Patent: May 10, 1994

[54] DIENE POLYMERS AND COPOLYMERS TERMINATED WITH COMPOUNDS HAVING MULTIPLE-BONDED NITROGEN ATOMS AND PARTIALLY CROSSLINKED WITH POLYFUNCTIONAL REAGENTS

[75] Inventors: David F. Lawson, Uniontown; Mark L. Stayer, Jr., Mogadore; Thomas A. Antkowiak, Rittman, all of Ohio

[73] Assignee: Bridgestone/Firestone, Inc., Akron, Ohio

[21] Appl. No.: 106,729

[22] Filed: Aug. 16, 1993

[51] Int. Cl.$^5$ .............................................. C08F 8/40
[52] U.S. Cl. ..................................... 525/102; 525/123; 525/332.8; 525/332.9; 525/333.1; 525/333.2; 525/340; 525/342; 525/359.4
[58] Field of Search ............... 525/102, 123, 340, 342, 525/359.4

[56] References Cited

U.S. PATENT DOCUMENTS

| | | | |
|---|---|---|---|
| 3,178,398 | 4/1965 | Strobel et al. | 525/332.8 |
| 4,677,153 | 6/1987 | Kitahara et al. | 525/332.8 |
| 4,816,520 | 3/1989 | Bronstert | 525/285 |
| 4,835,209 | 5/1989 | Kitagawa et al. | 525/107 |
| 4,935,471 | 6/1990 | Halasa et al. | 525/332.8 |
| 5,109,907 | 5/1992 | Stayer, Jr. et al. | 525/315 |
| 5,153,271 | 10/1992 | Lawson et al. | 525/332.8 |

Primary Examiner—Bernard Lipman
Attorney, Agent, or Firm—Frank J. Troy, Sr.

[57] ABSTRACT

Diene polymers or copolymers having improved raw polymer viscosity and reduced hysteresis in the cured and carbon black reinforced state are provided. These diene polymers or copolymers are prepared by a method which involves first terminating substantially all of the living diene polymer or copolymer chains obtained by anionic polymerization with a compound having multiple-bonded nitrogen atoms selected from the group consisting of aromatic nitriles and substituted imines having the formula

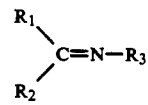

and then coupling a portion of the resultant terminated polymer chains with a polyfunctional reagent selected from the groups consisting of silicon polyhalides, polyisocyanates, phosphoryl halides and polycarboxylic acid halides.

10 Claims, No Drawings

DIENE POLYMERS AND COPOLYMERS TERMINATED WITH COMPOUNDS HAVING MULTIPLE-BONDED NITROGEN ATOMS AND PARTIALLY CROSSLINKED WITH POLYFUNCTIONAL REAGENTS

BACKGROUND OF THE INVENTION

The invention relates to diene polymers or copolymers having improved raw polymer viscosity which are adapted to form elastomer compositions having reduced hysteresis properties and tire treads having reduced rolling resistance. More particularly, the invention relates to a method for preparing such diene polymers or copolymers which involves terminating the polymer chains with a compound having multiple-bonded nitrogen atoms and partially crosslinking the polymer chains with a polyfunctional reagent.

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion Low rolling resistance is desirable from a fuel consumption standpoint while good wet traction is desirable from a safety standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction The approaches involving modification of the elastomer have generally been based on improving the interaction between the elastomer and the carbon black used in compounding the elastomer to prepare the tire tread composition in order to improve the dispersion of the carbon black into the elastomer. This has the effect of reducing the hysteresis of the elastomer composition which in turn results in lower rolling resistance of the treads formed therefrom.

One known approach to modifying the diene polymer or copolymer elastomer to reduce the hysteresis of elastomer compositions formed therefrom involves coupling the living diene polymer or copolymer chains with metal halides Thus, U.S. Pat. Nos. 4,383,085 and 4,515,922 describe the coupling of living diene polymer or copolymer chains obtained by anionic polymerization using an organolithium initiator with metal halides such as tin halides, silicon halides and the like. These patents indicate that tire treads formed from rubber compositions containing the coupled polymers have reduced hysteresis along with reduced rolling resistance and improved wet skid resistance.

Another known approach to modifying the diene polymer or copolymer elastomer to reduce the hysteresis of the elastomer compositions involves terminating the living diene polymer or copolymer chains with various compounds containing functional groups which are reactive with the lithium terminals of the living polymer including compounds containing multiple-bonded nitrogen atoms as illustrated by the following patents:

U.S. Pat. No. 3,178,398 relates to a method of preparing polymers including diene polymers and copolymers having terminal groups containing reactive nitrogen and to the curing of the resultant polymers with polyhalogen-containing compounds. The patent discloses that diene polymers or copolymers containing such terminal groups can be prepared by reacting the living diene polymer or copolymer with a non-polymerizable compound containing the structure

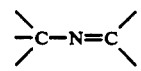

Compounds containing the foregoing structure which are disclosed in the reference include heterocyclic nitrogen compounds, substituted imines and carbodiimides. Substituted imines which are specifically disclosed include N-ethylethylidenimine, N-methylbenzylidenimine, N-hexylcinnamyl idenimine, N-decyl-2-ethyl-1,2-diphenylbutylidenimine, N-phenylbenzylidenimine, N-dodecylcyclohexanimine, N-propyl-2,5-cyclohexadienimine, N- methyl-1-naphthalenimine, N-N,-dimethylbutanediimine, N,N'-dipentyl-2 -pentene-1,5-diimine, N-nonyl- 1,4-naphthoquinonimine, N,N'-diphenyl-1, 4-quinonediimine and N,N'-diphenyl-1,3-indandiimine. The patent indicates that when such polymers are compounded and cured the resultant product has a good balance of physical properties. However, no mention is made of any effect on the hysteresis of the product.

U.S. Pat. No. 4,677,153 relates to a method for modifying a rubber having unsaturated carbon-to-carbon bonds (i.e. double bonds) with (a) an organic compound having a group represented by the formula —CH═N— —and (b) an organic acid halide having a group represented by the formula —COX wherein X is a halogen atom, in the presence of a Lewis acid. Organic compounds having the group represented by the formula —CH═N—which are disclosed include substituted imines such as, for example, benzylidene methylamine, benzylidene aniline, dimethylaminobenzylidene butylaniline, etc. However, a careful reading of the reference indicates that the unsaturated rubber which is reacted with the (a) and (b) compounds is not a living polymer rubber but rather a previously terminated or "dead" polymer rubber. Thus, it appears clearly evident that the reaction between the unsaturated rubber and these compounds is not at the terminals of the polymer chains of the rubber. The reference teaches that the modified rubber has improved green strength and when vulcanized has improved tensile and rebound resiliency.

U.S. Pat. No. 4,816,520 relates to terminally functionalized polymers, including diene polymers and copolymers, and a process for their preparation. The reference discloses that the terminally functionalized polymers are prepared from living polymers obtained by anionic polymerization of olefinically unsaturated monomers by first reacting the living polymers with the capping reagents comprising various nitrogen compounds including substituted imines (Schiff bases) and diaziridines and then reacting the capped polymer with a terminating agent which contains halogen or acid anhydride groups.

Capping reagents which are disclosed include among others a compound of the formula:

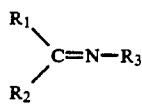

wherein $R_1$ is H, alkyl, cycloalkyl or aryl and $R_2$ and R are each alkyl, cycloalkyl or aryl. Terminating agents which are disclosed include halogen compounds such as chloromethylstyrenes, acryloyl chloride, methacryloyl chloride, epichlorohydrin, etc. and acid anhydride compounds such as acrylic anhydride, methacrylic anhydride, maleic anhydride, etc. The reference discloses that the resultant terminally functionalized polymer contains polymerizible end groups which allows for the preparation of graft copolymers.

U.S. Pat. No. 4,835,209 discloses the termination of living diene polymer or copolymer chains with carbodiimides. The patent discloses that rubber compositions containing such polymers have excellent performance characteristics with respect to tensile strength, impact resistance, low heat-generating properties and wear resistance without impairing wet skid properties.

U.S. Pat. No. 4,935,471 discloses a process for preparing a polydiene having a high level of affinity for carbon black which comprises reacting a metal terminated polydiene with a capping agent selected from the group consisting of (a) halogenated nitriles having the structural formula $X-A-C\equiv N$ wherein X represents a halogen atom and wherein A represents an alkylene group containing from 1 to 20 carbon atoms, (b) heterocyclic aromatic nitrogen containing compounds and (c) alkyl benzoates. The patent discloses that compositions containing such polymers have reduced hysteresis and that tire treads made from such compositions have lower rolling resistance and better traction characteristics.

U.S. Pat. No. 5,109,907 to Mark L. Stayer et al which is commonly assigned to the same assignee herein discloses diene polymers and copolymers terminated by reaction with the same substituted imines utilized in the present invention.

U.S. Pat. No. 5,153,271 to David F. Lawson et al, the same inventors herein, and which is commonly assigned to the same assignee herein, discloses diene polymers and copolymers terminated by reaction with the same aromatic nitriles utilized in the present invention.

Diene polymer or copolymer elastomers containing a mixture of coupled polymer chains and certain terminally functionalized polymer chains and a method for their preparation are also known in the art. Thus, U.S. Pat. No. 4,616,069 discloses a process for making a diene polymer rubber which comprises reacting an active diene polymer rubber having alkali metal and/or alkaline earth metal terminals, with: (1) a tin compound expressed by the general formula $R_aSnX_b$ (in which R stands for an alkyl, alkenyl, cycloalkyl or aromatic hydrocarbon group; X is a halogen atom, a is an integer of 0-2, and b is an integer of 2-4), and (2) at least one organic compound selected from the group consisting of aminoaldehydes, aminoketones, aminothioaldehydes, aminothioketones and the organic compounds having in their molecules

linkages in which A stands for an oxygen or sulfur atom.

Organic compounds containing such linkages which are disclosed include various amide compounds, imide compounds, lactam compounds, urea compounds, carbamic acid derivatives and the corresponding sulfur-containing compounds.

The patent discloses that the order of the reaction with the tin compounds (1) and organic compounds (2) is optional, i.e. they may be performed sequentially by optional order or they may be performed simultaneously. The reference further discloses that the rubber material of the invention shows well-balanced rolling resistance (rebound) and wet skid resistance and also good processability and storage stability.

U.S. Pat. No. 5,227,431, which is commonly assigned to the same assignee herein discloses diene polymers and copolymers containing a mixture of specified proportions of diene polymer or copolymer chains coupled with tin polyhalides and diene polymer or copolymer chains terminated with substituted imines of the type utilized in the present invention. The diene polymers or copolymers are prepared by a method referred to by the inventors as "primary partial coupling" which involves first preparing a living diene polymer or copolymer containing organoalkali or organo alkaline earth metal terminals by anionic polymerization of a conjugated diene monomer or a mixture of a conjugated diene monomer and a vinyl aromatic hydrocarbon monomer; then coupling a portion of the living diene polymer or copolymer chains by reacting the active terminals thereof with a tin polyhalide and then terminating the remaining portion of the living diene polymer or copolymer chains by reacting the active terminals thereof with a substituted imine. The resultant diene polymers or copolymers have good raw polymer viscosity, good compound viscosity and reduced hysteresis in the cured and carbon black reinforced state and can be used to form elastomer compositions for the treads having reduced rolling resistance.

U.S. application Ser. No. 794,105 of the same inventors herein filed Nov. 18, 1991 discloses diene polymers and copolymers containing a mixture of specified proportions of diene polymer or copolymer chains coupled with tin polyhalides and diene polymer or copolymer chains terminated with aromatic nitriles of the type utilized in the present invention. The diene polymers or copolymers are prepared by a method referred to as "primary partial coupling" which involves first preparing a living diene polymer or copolymer containing active organoalkali or organoalkaline earth metal terminals by anionic polymerization of a conjugated diene monomer or a mixture of a conjugated diene monomer and a vinyl aromatic hydrocarbon monomer; coupling a portion of the living diene polymer or copolymer chains by reacting the active terminals thereof with a tin polyhalide and then terminating the remaining portion of the living diene polymer or copolymer chains by reacting the active terminals thereof with an aromatic nitrile compound selected from the group consisting of unsubstituted and substituted benzonitriles. The resultant diene polymers or copolymers can be used to form elastomer compositions for tire treads having reduced rolling resistance.

Diene polymer and copolymer elastomers described in the aforementioned patents possess certain advantages in important properties such as reduced hysteresis (i.e. lower rolling resistance) and good traction and, in certain instances, good processability. However, those skilled in the rubber and tire art continue to seek polymers and rubber compositions having an excellent balance of such properties.

SUMMARY OF THE INVENTION

In accordance with the present invention, a method of preparing diene polymers or copolymers and elastomer compositions having an excellent balance of properties such as improved raw polymer viscosity and good compound viscosity in the uncured state and reduced hysteresis and lower rolling resistance in the cured state is provided. The diene polymers or copolymers are prepared by a method referred to as "secondary partial coupling" which comprises the steps in sequence of:

(1) preparing a living diene polymer or copolymer containing active organoalkali or organoalkaline earth metal terminals by anionically polymerizing a conjugated diene monomer or a mixture of a conjugated diene monomer and a vinyl aromatic hydrocarbon monomer in a hydrocarbon solvent using an organalkali metal or organoalkaline earth metal initiator;

(2) terminating substantially all of the living diene polymer or copolymer chains by reacting the organoalkali or organoalkaline earth metal terminals thereof with from about 0.6 to about 2 moles of a compound having multiple-bonded nitrogen atoms selected from the group consisting of aromatic nitriles and substituted imines having the formula:

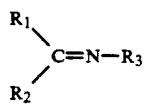

wherein $R_1$ and $R_2$ are selected from the group consisting of H, alkyl, cycloalkyl, aryl, dialkylaminoaryl, aralkyl, and aprotic O,N, and S—containing alkyl, cycloalkyl, aryl and aralkyl groups; wherein $R_3$ is selected from the group consisting of alkyl, cycloalkyl, aryl, dialkylaminoaryl, aralkyl and aprotic O,N and S-containing alkyl, cycloalkyl, aryl, and aralkyl groups; with the provision that at least one of the $R_1$, $R_2$ and $R_3$ groups must be a dialkylamino aryl group and that not all of the $R_1$, $R_2$ and $R_3$ groups can be aryl groups; and (3) coupling from about 10 to about 70 percent by weight of the terminated polymer chains with a polyfunctional reagent selected from the group consisting of silicon polyhalides, polyisocyanates, phosphoryl halides and polycarboxylic acid halides.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to further polymerization, or to coupling and/or terminating reactions.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values at 50° to 65° C. are indicative of low hysteresis and, consequently, tires formed from such elastomer compositions have lower rolling resistance.

The diene polymers or copolymers of the invention are prepared by a method which broadly involves the steps of first preparing a living diene polymer or copolymer containing active organoalkali or organoalkaline earth metal terminals by anionic polymerization of a conjugated diene monomer or mixture of a conjugated diene monomer and a vinyl aromatic hydrocarbon monomer, then terminating substantially all of the living diene polymer or copolymer chains with an aromatic nitrile or a substituted imine of specified formula and then coupling a portion of the terminated polymer chains, which are no longer "living" but remain reactive towards coupling, with a polyfunctional reagent.

The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1, 3-butadiene, 2-methyl-1, 3-butadiene (isoprene), 2,3-dimethyl-1, 3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyllithium. A number of initiators of this type are described in U.S. Pat. No. 5,153,159, which is commonly assigned to the same assignee herein, the disclosure of which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from about 99 to 20 percent by weight and vinyl aromatic hydrocarbon contents of from about 1 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2-microstructure contents ranging form about 10 to about 80 percent with the preferred polymers or copolymers having 1,2-microstructure contents of from 15 to 65 percent. The preparation of diene polymers or copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and concentration Effects on Polar-Modifier Alkyllithium Polymerizations and Copolymerization", Journal of Polymer Science, Part A-1, Vol. 10, pages 1319-1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

As indicated, the second step of the method of the invention involves the termination of substantially all of the living diene polymer or copolymer chains with an aromatic nitrile or a substituted imine.

Aromatic nitrile compounds which may be employed include unsubstituted and substituted benzonitriles such as o-,m-, and p-tolunitrile, 2-methoxybenzonitrile, 3-methoxybenzonitrile, 4-methoxybenzonitrile, and the like and N,N-dialkylaminobenzonitriles such as N,N-dimethylaminobenzonitrile, N,N-diethylaminobenzonitrile, N,N-dibutylaminobenzonitrile, N,N-dihexylaminobenzonitrile, N,N-dioctylaminobenzonitrile, 4-pyrrolidinobenzonitrile, 5-cyano-1-methylindole, and the like. The preferred aromatic nitrile compound is benzonitrile.

Substituted imines which may be employed are those having the formula:

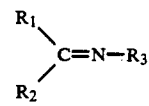

wherein $R_1$ and $R_2$ are selected from the group consisting of H, alkyl, cycloalkyl, aryl, dialkylaminoaryl, aralkyl and aprotic O,N and S—containing alkyl, cycloalkyl, aryl and aralkyl groups; wherein $R_3$ is selected from the group consisting of alkyl, cycloalkyl, aryl, dialkylaminoaryl, aralkyl and aprotic O, N, and S—containing alkyl, cycloalkyl, aryl and aralkyl groups; with the proviso that at least one of the $R_1$, $R_2$ and $R_3$ groups must be a dialkylaminoaryl group and that not all of the $R_1$, $R_2$ and $R_3$ groups can be aryl groups. The alkyl groups in the above formula may contain from 1 to 20 carbon atoms with alkyl groups containing from 1 to 8 carbons being preferred.

It should be noted in regard to the dialkylamino aryl group that the alkyl group of the dialkylamino substituent may be either linear, branched or cyclic in nature. Thus, the dialkylamino substituent may be represented by the formula:

or by the formula:

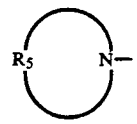

Wherein $R_4$ is an alkyl, cycloalkyl or aralkyl group containing from 1 to 12 carbon atoms and $R_5$ contains from 3 to about 5 methylene groups.

The preferred substituted imines represented by the general formula fall into two classes:

(1) Those in which $R_1$ is H and $R_2$ and $R_3$ are aryl groups with at least one of the $R_2$ and $R_3$ groups being a dialkylaminoaryl group.

(2) Those in which $R_1$ is H, $R_2$ is alkyl or aralkyl in which the carbon adjacent to the imine carbon is completely substituted with alkyl, aryl or aralkyl groups and $R_3$ is a dialkylaminoaryl group.

Illustrative examples of the $R_2$ groups of the second class include those represented by the formulae:

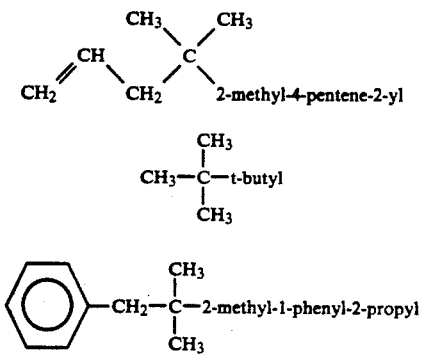

Illustrative examples of substituted imines which may be employed include dialkylaminobenzylidene alkylamines such as dimethylaminobenzylidene methylamine, dimethylaminobenzylidene ethylamine, dimethylaminobenzylidene butylamine and the like; dialkylaminobenzylidene anilines such as dimethylaminobenzylidene aniline, dimethylaminobenzylidene butylaniline, dimethylaminobenzylidene dodecylaniline and the like; dialkylaminobenzylidene alkoxyanilines such as dimethylaminobenzylidene methoxyaniline, dimethylaminobenzylidene ethoxyaniline and the like; dialkylaminobenzylidene dialkylaminoanilines such as dimethylaminobenzylidene dimethylaminoaniline; benzylidene dialkylaminoanilines such as benzylidene dimethylaminoaniline, benzylidene diethylaminoaniline and the like and alkoxybenzylidene dialkylaminoanilines such as methoxybenzylidene dimethylaminoaniline, methoxybenzylidene diethylaminoaniline and the like and α,α-dialkylalkylidene dialkylaminoanilines.

Particularly preferred substituted imines for use in preparing the terminally functionalized polymers of the invention are dimethylaminobenzylidene aniline, dimethylaminobenzylidene butylaniline, benzylidene dimethylaminoaniline, dimethylaminobenzylidene methoxyaniline, methoxybenzylidene dimethylaminoaniline, dimethylaminobenzylidene dodecylaniline and 2-methylpent-4-en-2-yl methylidene p-dimethylaminoaniline.

The reaction of the living polymer in solution with the terminating agent can be conducted if desired by simply adding the terminating agent per se to the polymer solution. However, it is generally preferred to add the terminating agent in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of terminated polymer desired in the finished polymer composition. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer chains may range from about 0.6 to about 2 moles of said terminating agent per mole of living polymer chains. However, the preferred amounts range from 0.8 to 1.4 moles of such terminating agent per mole of living polymer chains.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about −20° C. to about 130° C. with the preferred temperatures ranging from 0° C. to 100° C. and especially preferred temperatures ranging from 20° C. to 85° C. The reaction times may also vary considerably and are, in general dependent upon reaction temperatures. Hence, the reaction times may range from about 2 min. to about 24 hr.

The third step in the method of the invention involves coupling from about 10 to about 70 percent by weight of the terminated polymer chains (i.e. polymers containing terminals derived from aromatic nitriles or substituted imines) with a polyfunctional reagent selected form the group consisting of silicon polyhalides, polyisocyanates, phosphoryl halides and polycarboxylic acid halides.

Silicon polyhalides which may be employed are those represented by the formula $R_n Si X_{4-n}$ wherein R is alkyl or aryl, X is a halogen selected from the group consisting of bromine, chlorine and iodine and n is an integer of from 0 to 2. Illustrative examples of such silicon polyhalides include silicon tetrabromide, silicon tetrachloride, silicon tetraiodide, methyl trichlorosilane, dimethyl dichlorosilane, bis (trichlorosilyl) ethane, phenyl trichlorosilane and the like. The preferred silicon polyhalide is silicon tetrachloride.

Polyisocyanates which may be employed include toluene2,4-diisocyanate, toluene-2,6-diisocyanate, the adduct of bisphenol A with two moles of toluene-2,4-diisocyanate (hereinafter referred to for convenience by the abbreviation, DIA), diphenyl methane diisocyanate, naphthalene diisocyanate, toluidine diisocyanate, triphenyl methane triisocyanate, p-phenylene diisocyanate, hexamethylene diisocyanate, xylene diisocyanate, naphthalene-1,2,5,7-tetraisocyanate, isophorone diisocyanate and the like. The preferred polyisocyanate is DIA.

Phosphoryl halides which may be employed include phosphoryl chloride, phosphoryl bromide, phosphoryl iodide and the like. The preferred phosphoryl halide is phosphoryl chloride.

Polycarboxylic acid halides which may be employed include di-, tri- or higher carboxylic acid chlorides and bromides such as malonoyl chloride, adipoyl chloride, adipoyl bromide, glutaroyl bromide, glutaroyl chloride, sebacoyl chloride sebacoyl bromide and the like. The preferred polycarboxylic acid halide is sebacoyl chloride.

The coupling reaction is conducted by reacting the terminated polymers, preferably in solution in the hydrocarbon solvent in which they were prepared, with the polyfunctional reagent (the coupling agent). The reaction can be carried out if desired by simply adding the coupling agent per se to the polymer solution. However, it is generally preferred to add the coupling agent in the form of a solution thereof in an appropriate solvent for ease of handling.

The amounts of coupling agent added to the terminated polymer are dependent upon the amounts of active terminal groups present in the polymer and the amounts of coupled polymer desired in the finished polymer composition. It should be noted that the number of moles of active terminal groups present in the polymer is presumed to be equivalent to the number of moles of alkali metal groups present in the organoalkali metal initiator utilized to effect polymerization. In general, the amount of coupling agent employed to react with the active terminal groups of the polymer chains may range about 0.1 to about 3 equivalents of coupling agent, based on the number of functional groups, per mole of polymer chains. However, preferred amounts of coupling agent range from 0.7 to 1.5 equivalents.

Temperatures employed in coupling the terminated polymer chains with the coupling agent may vary considerably and are selected with the basic criteria of preserving the terminal groups of the polymer chains for reaction with the coupling agent. Thus, the reaction temperatures may range from about $-20°$ C. to about 130° C. with preferred temperatures ranging from 0° C. to 100° C. and especially preferred temperatures ranging from $+20°$ C. to 85° C. The reaction times may also vary somewhat and are, in general, dependent upon reaction temperatures. Hence, the reaction times may range from about 2 min. to about 24 hr. with preferred reaction times ranging from 15 min. to 6 hr.

After the coupling reaction is complete, it is generally desirable to quench the polymer mixture in order to deactivate any residual live alkali metal end groups (e.g. lithium end groups) which may remain. This serves to prevent the polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant diene polymer or copolymer which contains a mixture of coupled polymer chains and polymer chains containing terminals derived from aromatic nitriles or substituted imines may be recovered from the polymer solution and dried using conventional procedures. Thus, for example, the polymer mixture can be recovered form solution by coagulation either by adding a sufficient volume of a nonsolvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The diene polymers or copolymers prepared by the method of the invention may contain from about 10 to about 70 percent by weight of coupled polymer or copolymer and corresponding from about 90 to about 30 percent by weight of polymer or copolymer containing terminals derived from aromatic nitriles or substituted imines. However, the preferred compositions are those containing from about 15 to about 40 percent by weight of coupled polymer or copolymer and from about 60 to about 85 percent by weight of polymer or copolymer containing terminals derived from aromatic nitriles or substituted imines.

As indicated, the diene polymers or copolymers prepared by the method of the invention are especially adapted for use in forming elastomer compositions having reduced hysteresis and tire treads having reduced rolling resistance. Such elastomer compositions may be prepared by mixing the diene polymers or copolymers with carbon black and other conventional rubber additives such as fillers, plasticizers, antioxidants, curing agents and the like using standard rubber mixing equipment and procedures. The elastomer compositions may optionally contain other polymers or rubbers such as natural rubber, polyisoprene, polybutadiene rubber, styrenebutadiene rubber or mixtures thereof. The elastomer compositions when vulcanized using conventional rubbers vulcanization conditions have reduced hysteresis properties and can be utilized as tread rubbers for tires having reduced rolling resistance.

The following examples are submitted for the purpose of further illustrating the nature of the present invention and should not be regarded as a limitation on the scope thereof. Parts and percentages shown in the examples are by weight unless otherwise indicated.

EXAMPLES 1-4

(A) Preparation of Living Random Copolymer of Butadiene/Styrene

A "living" medium vinyl butadiene/styrene copolymer was prepared in accordance with the following procedure: To a stainless steel 5 gallon reactor equipped with a stirrer and thermometer and maintained under a nitrogen atmosphere was charged 309 grams (2.97 moles) of styrene, 1235 grams (22.87 moles) of 1,3-butadiene, 25.4 lbs of hexane, 8.2 millimoles (hereinafter abbreviated as mM) of N,N,N',N'-tetramethylethylene diamine (TMEDA) and 11.86 mM of n-butyllithium initiator. After addition of the ingredients was completed, the temperature of the reaction mixture was controlled at 30°-50° C. for 4.5hours with stirring under positive nitrogen pressure. A sample of the resultant living polymer was quenched with isopropanol and drum dried to serve as a control (designated $C_1$ for convenience). For comparative purposes, a sample of living copolymer was terminated with benzonitrile to serve as an additional control (designated $C_2$ for convenience).

The control copolymer, $C_1$, was analyzed by GPC, HNMR and DSC to determine molecular weight (Mw and Mn), molecular weight distribution (Mw/Mn), vinyl content (1,2-content), styrene content and glass transition temperature (Tg). Results were as follows:
HSGPC(THF):
$M_n = 143,280$
$M_w = 159,041$
$M_w/M_n = 1.11$
NMR: Styrene=20.8%
Vinyl Content=50.7% (based on butadiene=100)
Tg= $-30.7°$ C.

(B) Reaction of Living Copolymer with Terminating Agent and Coupling Agent

The living copolymer prepared in step (A) was sampled from the pressurized reactor through a hypodermic syringe into 28 ounce glass bottles (capped with three-holed caps and rubber liners) containing 1.1 equivalents per equivalent of lithium of the terminating agent, benzonitrile, added as a 0.54 molar solution in hexane and the bottle contents were agitated and heated for 1 hour at 50° C. Then, various coupling agents were added to the bottles and the contents were agitated with heating at 50° C. for an additional 0.25 hour period. Types and amounts of reagents employed are shown in Table I.

TABLE I

| Example | Terminating Agent Type | Amount Meq/mMLi) | Coupling Agent Type | Amount (Meq/mMLi) |
|---|---|---|---|---|
| C₁ | isopropanol | — | — | — |
| C₂ | BN* | — | — | — |
| 1 | BN | 1.1 | SiCl₄ | 1.5 |
| 2 | BN | 1.1 | DIA** | 0.2 |
| 3 | BN | 1.1 | POCl₃ | 0.3 |
| 4 | BN | 1.1 | SebCl*** | 0.4 |

*BN = Abbreviation for benzonitrile
*DIA = abbreviation for the adduct of bisphenol -A with 2 moles of toluene-2,4-diisocyanate.
**SebCl = abbreviation for sebacoyl chloride.

The resultant copolymer solutions were quenched with isopropanol, treated with an antioxidant, removed from the bottles, coagulated in isopropanol and then drum dried.

(C) Preparation of Tread Rubber Compounds

Prior to compounding, samples of the above copolymers were tested for Mooney Viscosity (ML/4/100° C.) in the raw or gum state, hereinafter referred to as Mooney Viscosity (gum). Samples of the copolymers were then compounded with carbon black and conventional rubber additives using a standard tread rubber formulation. The standard tread rubber compound had the following formulation:

|  | Parts by Weight |
|---|---|
| Copolymer | 100.0 |
| Carbon Black | 55.0 |
| Process Oil | 10.0 |
| Zinc Oxide | 3.0 |
| Stearic Acid | 2.0 |
| Antioxidant | 1.0 |
| Wax | 2.0 |
| Sulfur | 1.5 |
| Accelerator | 1.0 |

The rubber compounds were mixed using conventional rubber mixing equipment and procedures. Samples of the resultant tread rubber compounds were tested for Mooney Viscosity (ML/4/100° C.), hereinafter Mooney Viscosity (cpd). Samples of the tread rubber compounds were cured as 1.5"×4"×0.040" plaques for 35 minutes at 149° C. and cut into rings for stress-strain tests. Additional samples of compounds were cured for 40 minutes at 149° C. and tested for hysteresis (Tan delta) properties. Tan delta (hereinafter Tan δ) was determined at 50° C. using a Dynastat machine operating at a frequency of 1 Herz and 7% strain. Tan δ is a measure of the ratio of the loss modulus of the compound to the storage modulus and generally, as indicated above, the lower the value of Tan δ, the lower the hysteresis of the compound. Tests and test results are shown in Table II.

TABLE II

| | Copolymer Ex. | | | | | |
|---|---|---|---|---|---|---|
| | C₁ | C₂ | 1 | 2 | 3 | 4 |
| Terminating Agent | isopropanol | BN | BN | BN | BN | BN |
| Coupling Agent | — | — | SiCl₄ | DIA | POCl₃ | SebCl |
| Mooney Viscosity (ML/4/100° C.) (gum) | 29.0 | 34.0 | 41.5 | 43.8 | 57.0 | 46.8 |
| Compound Properties | | | | | | |
| Mooney Viscosity (ML/4/100° C. cpd) | 61.4 | 75.5 | 75.5 | 78.0 | 77.7 | 77.0 |
| Tan δ, 50° C. | 0.2010 | 0.1095 | 0.1050 | 0.1051 | 0.1073 | 0.1015 |
| % Δ, Tan δ* | — | −45.5 | −47.8 | −47.7 | −46.6 | −49.5 |
| Stress-Strain, R.T. | | | | | | |
| 300% Modulus, psi | 2074 | 2100 | 2294 | 2003 | 2091 | 1655 |
| Tensile, psi | 2329 | 2578 | 3127 | 2586 | 2577 | 2255 |
| Elongation at break, % | 377 | 401 | 430 | 416 | 406 | 446 |

*% change in Tan δ (minus values indicate reduction in Tan δ).

These results show greatly reduced tangent delta values, indicative of reduced hysteresis, in the copolymers of Examples C₂ and Examples 1-4 as compared to control Example C₁ where there was no functional end group termination or coupling. Secondary coupling through either SiCl₄ (Example 1), DIA (Example 2), POCl₃ (Example 3) and sebacoyl chloride (Example 4) resulted in significant increases in raw or gum polymer viscosity compared to the benzonitrile-terminated copolymer of control Example C₂. Example 3 involving secondary coupling through POCl₃ exhibited a remarkable increase in gum polymer viscosity. It is noteworthy that these increases in raw polymer viscosity had very little effect on compound viscosity and there was no adverse effect on the excellent low tangent delta values. This indicates that polymers prepared by the method of the invention will have sufficient viscosity for drying and handling yet moderate compounded viscosity for facile mixing and desirable processability.

EXAMPLES 5-6

In these examples, additional copolymers were prepared by the method of the invention by first terminating the living copolymer chains with a substituted imine and then coupling a portion of the terminated polymer chains with a coupling agent. For comparative purposes, a copolymer terminated with isopropanol and a copolymer terminated with a substituted imine (designated examples C₃ and C₄ for convenience) were prepared to serve as controls. The copolymers were prepared substantially in accordance with the procedures of steps (A) and (B) of Examples 1-4. Types and amounts of treating agents are shown in Table III.

TABLE III

| | Terminating Agent | | Coupling Agent | |
|---|---|---|---|---|
| Example | Type | Amount Meq/mM Li | Type | Meq/mM Li |
| C₃ | isopropanol | — | — | — |
| C₄ | DMABA* | — | — | — |
| 5 | DMABA | 1.1 | SiCl₄ | 1.5 |

TABLE III-continued

| | Terminating Agent | | Coupling Agent | |
|---|---|---|---|---|
| Example | Type | Amount Meq/mM Li | Type | Meq/mM Li |
| 6 | DMABM** | 1.1 | SiCl₄ | 1.5 |

*DMABA = abbreviation for p -(N,N-dimethylamino)-benzylidene aniline
**DMABM = abbreviation for p-(N,N-dimethylamino)-benzylidene methylamine.

The control copolymer, C₃, was analyzed as described above. Results were as follows:

| | |
|---|---|
| Mm = 148,014 | Styrene = 21.0% |
| Mw = 165,776 | |
| Mw/Mn = 1.12 | |
| Tg = −29.3° C. | |
| Vinyl content = 50.0% | |

The copolymers were tested for gum Mooney Viscosity, compounded using the standard tread rubber formulation and tested for various properties as in Examples 1–4. Tests and test results are shown in Table IV.

TABLE IV

| | Copolymer Ex. | | | |
|---|---|---|---|---|
| | C₃ | C₄ | 5 | 6 |
| Terminating Agent | isopropanol | DMABA | DMABA | DMABM |
| Coupling Agent | — | — | SiCl₄ | SiCl₄ |
| Mooney Viscosity (ML/4/100° C.) (gum) | 32.0 | 33.0 | 47.0 | 38.0 |
| Compound Properties | | | | |
| Mooney Viscosity (ML/4/100° C. Cpd) | 67.0 | 81.0 | 89.0 | 76.5 |
| Tan δ, 50° C. | 0.1793 | 0.0947 | 0.0997 | 0.1357 |
| % Δ, Tan δ | — | −47.2 | −44.4 | −24.3 |
| Stress-Strain, R.T. | | | | |
| 300% Modulus, psi | 1958 | 2350 | 2218 | 2059 |
| Tensile, psi | 2253 | 2832 | 2693 | 2687 |
| Elongation at break, % | 389 | 396 | 400 | 425 |

We claim:
1. A method for preparing a diene polymer or copolymer having improved processability and adapted to form elastomer compositions having reduced hysteresis properties comprising the steps in sequence of:
(1) preparing a living diene polymer or copolymer containing active organoalkali or organoalkaline earth metal terminals by anionically polymerizing a conjugated diene monomer or mixture of a conjugated diene monomer and vinyl aromatic hydrocarbon monomer in a hydrocarbon solvent using an organoalkali metal or organoalkaline earth metal initiator;
(2) terminating substantially all of the living diene polymer or copolymer chains by reacting the organoalkali or organoalkaline earth metal terminal thereof with from about 0.6 to about 2 moles of a compound having multiple-bonded nitrogen atoms selected from the groups consisting of aromatic nitriles and substituted imines having the formula:

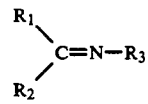

wherein R₁ and R₂ are selected from the group consisting of H, alkyl, cycloalkyl, aryl, dialkylaminoaryl, aralkyl and aprotic O, N and S—containing alkyl, cycloalkyl, aryl and aralkyl groups; wherein R₃ is selected from the group consisting of alkyl, cycloalkyl, aryl, dialkylaminoaryl, aralkyl and aprotic O, N, and S—containing alkyl, cycloalkyl, aryl and aralkyl groups; with the proviso that at least one of the R₁, R₂ and R₃ groups must be a dialkylaminoaryl group and that not all of the R₁, R₂ and R₃ groups can be aryl groups; and
(3) coupling from about 10 to about 70 percent by weight of the terminated polymer chains with a polyfunctional reagent selected from the group consisting of silicon polyhalides, polyisocyanates, phosphoryl halides and polycarboxylic acid halides.

2. The method of claim 1 wherein said living diene polymer or copolymer is a living polymer of butadiene or a copolymer of butadiene and styrene.

3. The method of claim 1 wherein said aromatic nitrile is selected from the group consisting of benzonitrile, o-, m-, and p-tolunitrile, 2-methoxybenzonitrile, 3-methoxybenzonitrile, 4-methoxybenzonitrile and N,N-(dialkylamino) benzonitriles.

4. The method of claims 1 wherein said aromatic nitrile is benzonitrile.

5. The method of claim 1 wherein said substituted imine is selected from the group consisting of dialkylaminobenzylidene alkylamines, dialkylaminobenzylidene anilines, dialkylaminobenzylidene alkoxyanilines, dialkylaminobenzylidene dialkylaminoanilines, benzylidene dialkylaminoanilines, alkoxybenzylidene dialkylaminoanilines and α,α-dialkylalkylidene dialkylaminoanilines.

6. The method of claim 1 wherein said substituted imine is dimethylaminobenzylidene aniline.

7. The method of claim 1 wherein said silicon polyhalide is silicon tetrachloride.

8. The method of claim 1 wherein said polyisocyanate is the adduct of bisphenol-A with 2 moles of toluene-2,4-diisocyanate.

9. The method of claim 1 wherein said polycarboxylic acid halide is sebacoyl chloride.

10. The method of claim 1 wherein said phosphoryl halide is phosphoryl chloride.

* * * * *